United States Patent
Polyakov et al.

(10) Patent No.: US 11,714,659 B2
(45) Date of Patent: *Aug. 1, 2023

(54) DEVICE PROVISIONING WITH MANUFACTURER BOOT ENVIRONMENT

(71) Applicant: VMware, Inc., Palo Alto, CA (US)

(72) Inventors: Alexey A. Polyakov, Sammamish, WA (US); Ondrej Stastny, Kirkland, WA (US)

(73) Assignee: VMWARE, INC., Palo Alto, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/382,417

(22) Filed: Jul. 22, 2021

(65) Prior Publication Data

US 2021/0349735 A1 Nov. 11, 2021

Related U.S. Application Data

(63) Continuation of application No. 16/432,111, filed on Jun. 5, 2019, now Pat. No. 11,093,260.

(51) Int. Cl.
*G06F 9/4401* (2018.01)
*G06F 8/61* (2018.01)

(52) U.S. Cl.
CPC .............. *G06F 9/4416* (2013.01); *G06F 8/61* (2013.01); *G06F 9/441* (2013.01); *G06F 9/4401* (2013.01)

(58) Field of Classification Search
CPC .......... G06F 8/61; G06F 9/4401; G06F 9/441; G06F 9/4416
See application file for complete search history.

(56) References Cited

U.S. PATENT DOCUMENTS

| | | | |
|---|---|---|---|
| 11,093,260 B2* | 8/2021 | Polyakov | G06F 9/441 |
| 2016/0188307 A1* | 6/2016 | Reagan | H04W 4/60 |
| | | | 717/177 |
| 2017/0094509 A1* | 3/2017 | Mistry | H04W 4/50 |

* cited by examiner

*Primary Examiner* — Terrell S Johnson
(74) *Attorney, Agent, or Firm* — Thomas Horstemeyer, LLP (57) ABSTRACT

Disclosed are various examples for device provisioning using a manufacturer boot environment. A management agent can be executed from a manufacturer's boot environment and can install a management application that is executable in the main operating system to provision a client device for management. The management agent can then set a provisioning status BIOS variable to indicate that the client device is provisioned. The client device can then be booted to the main operating system and the management application can be executed.

20 Claims, 5 Drawing Sheets

DEVICE PROVISIONING WITH MANUFACTURER BOOT ENVIRONMENT

CROSS REFERENCE TO RELATED APPLICATIONS

This Application is a continuation of, and claims priority to and the benefit of, U.S. application Ser. No. 16/432,111, filed on Jun. 5, 2019, and entitled "DEVICE PROVISIONING WITH MANUFACTURER BOOT ENVIRONMENT," which is hereby incorporated herein by reference in its entirety.

BACKGROUND

Organizations and other enterprises can secure emails, presentations, documents and other content to prevent theft, data loss and unauthorized access. A management service can provide protection for this content by securing the enterprise applications through which the content is accessed and enforcing enterprise requirements on the devices. Enterprises can require enterprise devices to be protected using the management service. As a result, enterprises can desire to maintain provisioning and enrollment of enterprise devices with the management service.

Certain events can disrupt or discontinue provisioning and enrollment. When enterprise devices experience these events, there is no way to ensure persistent management service provisioning and enrollment of the device. For example, operating system repair, reinstallation, or replacement can result in a loss of enrollment and provisioning of the device. Provisioning and enrollment can also be lost based on hard drive wipes, driver crashes, software crashes, operating system crashes, hardware failures, software changes, and hardware changes. While system administrators or information technology professionals can reinstall management components and enroll the devices, this can be time consuming and inefficient. Moreover, the device may not be in possession of an administrator or information technology professional. Disruption of device enrollment can result in loss of productivity and loss of device protections. As a result, there is a need for improved mechanisms to maintain provisioning and enrollment for enterprise devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to persistent device provisioning and enrollment. Organizations and other enterprises can secure emails, presentations, documents and other content to prevent theft, data loss and unauthorized access. A management service can provide protection for this content by securing the enterprise applications through which the content is accessed, and enforcing enterprise requirements on the client devices. Operating system repair, reinstallation, or replacement can result in a loss of enrollment and provisioning of the device. Provisioning and enrollment can also be lost based on hard drive wipes, driver crashes, software crashes, operating system crashes, hardware failures, software changes, and hardware changes. Provisioning can refer to installation and configuration of management components that enable management by a management service. The managing components can include components that execute in a manufacturer boot environment and a main operating system, respectively. Enrollment can include a process of obtaining and installing an enrollment policy on a device. The present disclosure describes mechanisms that enable persistent device provisioning and enrollment. These mechanisms can provision and enroll a client device on initial startup, and following events that disrupt the provisioning status of the client device.

Figure 1:
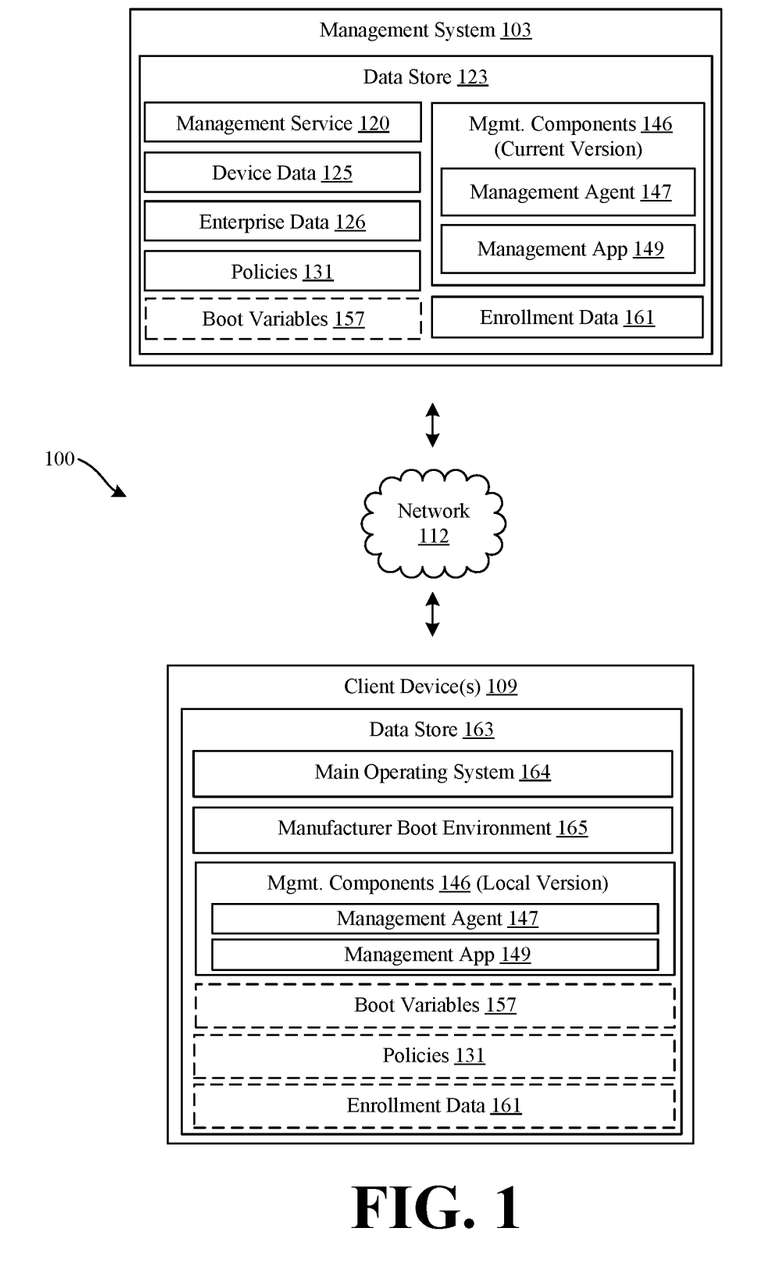
FIG. 1 is a drawing of an example of a networked environment, including a management system and a client device.

With reference to FIG. 1, shown is an example of a networked environment 100. The networked environment 100 can include a management system 103 and client device(s) 109 in communication with one another over a network 112. The management system 103 can provide an enterprise with access to email, corporate documents, social media and other enterprise content. The management system 103 can also store a current version of management components 146 that can enable client device 109 provisioning using a manufacturer boot environment 165 of the client device 109.

The network 112 can include, for example, the Internet, intranets, extranets, wide area networks (WANs), local area networks (LANs), wired networks, wireless networks, other suitable networks, or any combination of two or more such networks. The networks can include satellite networks, cable networks, Ethernet networks, cellular networks, telephony networks and other types of networks.

The management system 103 can include a server computer or any other system providing computing capability. Alternatively, the management system 103 can include a plurality of computing devices that are arranged in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above. As the management system 103 communicates with the client device 109 remotely over the network 112, the management system 103 can be described as a remote management system 103 or a collection of one or more remote computing devices.

The management system 103 can execute a management service 120 to oversee management of the client devices 109. The components executed on the management system 103 can include the management service 120, as well as other applications, services, processes, systems, engines or functionality not discussed in detail. An enterprise, such as one or more companies or other organizations, can operate the management service 120 to oversee or manage the operation of the client devices 109 of its employees, contractors, customers, students or other users having user accounts with the enterprise. An enterprise can include any customer of the management service 120.

The management service 120 can have a command queue storing an action to perform on a particular client device 109 upon check-in of the client device 109. For instance, the management application 149 can cause the client device 109 to check-in with the management service 120, identify an action in the command queue and perform the action. An action in the command queue can direct the installation of a profile or the execution of a command or other actions to install software components or implement policies.

In addition, the management service 120 can request that the client device 109 check in using a notification service like APPLE® Push Notification Service (APNS), GOOGLE® Cloud Messaging (GCM), or WINDOWS® Push Notification Services (WNS). The management service 120 can transmit a request to the notification service requesting that the client device 109 check-in or requesting that an application or web app check-in. The notification service can push or otherwise route a notification to the client device 109. Once the notification is received, the management application 149 can cause the client device 109 to check-in with the management service 120. As described above, the management application 149 can determine whether a command queue provided by the management service 120 for the respective client device 109 contains any commands or resources for the client device 109, and, if so, can cause the commands or resources to be downloaded or implemented on the client device 109. Other types of push notifications can also be transmitted through the push notification service.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance, APIs provided can include Representational State Transfer (REST) APIs, Identity Services Engine (ISE) APIs and other APIs.

The data store 123 can include memory of the management system 103, mass storage resources of the management system 103, or any other storage resources on which data can be stored and accessed by the management system 103. The data stored in the data store 123 can include management data such as a management service 120, device data 125, enterprise data 126, policies 131, management components 146, boot variables 157, enrollment data 161, as well as other data.

Generally, device data 125 can include data associated with a configuration of a client device 109 enrolled or managed by the management service 120 as well as an identifier of the client device 109. The identifier can be a serial number, media access control (MAC) address, other network address or other device identifier. In addition, the device data 125 can include an enrollment status indicating whether a client device 109 has been enrolled with the management service 120. In one example, a client device 109 designated as "enrolled" can be permitted to access the enterprise data 126 while a client device 109 designated as "not enrolled," or having no designation, can be denied access to the enterprise data 126.

Additionally, device data 125 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Policies 131 can include enrollment policies that indicate enrollment of the client device 109 with the management service 120, as well as additional policies that enforce hardware and software configurations on the client device 109. The policies 131 can be based on a number of factors, including geographical location of the client device 109, activation status, enrollment status and authentication data, including authentication data obtained by a device registration system, time, date and network properties, among other factors. The management service 120 can communicate with a management agent 147, management application 149, or another client application executable on the client device 109 to determine whether states exist on the client device 109 that do not satisfy one or more policies 131. Some of these states can include a virus or malware being detected on the client device 109, installation or execution of a blacklisted client application or a client device 109 being "rooted" or "jailbroken," where root access is provided to a user of the client device 109. Additional states can include the presence of particular files, questionable device configurations, vulnerable versions of client applications, or other vulnerability, as can be appreciated.

The management service 120 can communicate with the management agent 147 and management application 149 to determine which states exist on the client device 109. The states can include a list of client applications that are installed, running or displayed on the client device 109. Additional states can include a list of hardware settings of the client device 109. The list of hardware settings can identify whether a hardware device of the client device 109 is enabled or disabled. For instance, a security policy 131 can require a particular hardware setting for a Bluetooth device, a WiFi device, an infrared device, a camera device, an audio recording device, a speaker device, a near-field communication (NFC) device, a radio-frequency identification (RFID) device or another hardware device. The policies 131 can permit or deny any of the states of the client device. For example, a policy 131 can require that one or a group of the hardware devices are enabled or disabled. The states can also include software settings of the client device 109. A list of software settings can identify whether a software functionality of the client device 109 is enabled or disabled. The software functionality can be provided by an operating system of the client device 109 or other instructions executed on the client device 109.

An enterprise can operate the management service 120 to oversee or manage the provisioning and operation of the client devices 109. The management service 120 can remotely configure the client device 109 by interacting with a management application 149 or another client application executed on the client device 109. The management service 120 can transmit various software components, including the current version of the management components 146, to the client device 109. These can be installed or configured by the manufacturer boot environment 165, and by the local version of the management components 146 that are already installed on the client device 109. Additional software components can include, for example, additional client applications, resources, libraries, drivers, device configurations, or other similar components that require installation on the client device 109 as specified by an administrator of the management service 120. The management service 120 can further cause policies 131 to be enforced on a client device 109. Policies 131 can include device-specific or user-specific settings, for example, restrictions or permissions pertaining to capabilities of a client device 109. For instance, policies 131 can require certain hardware or software functions of the client device 109 to be enabled or disabled during a certain time period or when the client device 109 is physically located at a particular location. Such policies can be implemented by the management application 149. Policies 131 can also include an enrollment policy 131 that indicates the client device 109 is enrolled with the management service 120.

The management components 146 can include current versions of the management agent 147 and the management application 149. These components can include instructions designed to execute on client device 109 in order to perform management commands in concert with the management service 120. The management agent 147 can be a management component 146 that is executable from the manufacturer boot environment 165 of the client device 109. The management application 149 can be a management component 146 that is executable from the main operating system 164 of the client device 109.

The boot variables 157 can include variables, flags, or indicators that describe states and settings of the client device 109. The boot variables 157 can include provisioning variables. The provisioning variables can include a provisioning requirement variable that indicates whether a client device 109 requires provisioning. The provisioning variables can also include a provisioning status variable that indicates whether the device is currently provisioned. The boot variables 157 can be stored in the data store 123 and accessed over the network 112 by the management components 146 and the manufacturer boot environment 165. The boot variables 157 can affect the actions performed by the management components 146 and the manufacturer boot environment 165.

Enrollment data 161 can include information for enrollment of a client device 109 with the management service 120. The enrollment data 161 can include an enrollment token like a character string, value, parameter, or file that can be used to authenticate the client device 109 with the management service 120. In some cases, the management service 120 can provide enrollment tokens corresponding to each of the client devices 109 and/or users that have a user account with the enterprise. To this end, a request for an enrollment token can be required to include a device identifier, username, password, or other information. An enrollment token can be valid during a certain time period after which the enrollment token can expire.

Enrollment data 161 can also include a network address or other information to facilitate communication between the client device 109 and the management service 120. Enrollment data 161 can also include a network endpoint address and other instructions for communications with the management service 120. The enrollment data 161 can be transmitted to the client device 109 and stored in the data store 163.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch or any other device with like capability.

The client device 109 can include a data store 163. The data store 163 can represent memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components. The data store 163 can include a main operating system 164, a manufacturer boot environment 165, management components 146, boot variables 157, policies 131, enrollment data 161, client applications, and other data. The client device 109 can also be equipped with networking capability or networking interfaces, including a localized networking or communication capability, such as a near-field communication (NFC) capability, radio-frequency identification (RFID) read or write capability or other localized communication capability. The client device 109 can be mobile and easily portable from one location to another.

The main operating system 164 can include a system software that facilitates operation of the client device 109, and execution of additional client applications. The main operating system 164 can include a MICROSOFT® Windows operating system, an APPLE® macOS operating system, a Linux operating system, a GOOGLE® Android operating system, an APPLE® iOS operating system, or other operating systems.

The manufacturer boot environment 165 can be a recovery or setup operating system that complies with Extensible Firmware Interface (EFI), Unified Extensible Firmware Interface (UEFI), or another extensible firmware specification. The manufacturer boot environment 165 can utilize a boot manager or boor process that checks a boot configuration of the client device 109, loads manufacturer boot environment 165 into memory, and executes the manufacturer boot environment 165. The boot configuration can be defined using boot variables 157 stored in a portion of the data store 163, which can include a nonvolatile memory area. The manufacturer boot environment 165 be loaded from the data store 163, such as an EFI or UEFI system partition of the hard drive, or a dedicated memory area separate from the hard drive. The manufacturer boot environment 165 can also load from a location accessed through the network 112 using network boot or HTTP boot functionality. This can allow the manufacturer boot environment 165 to persist through hard drive errors or replacement and other critical system crashes and events. The manufacturer boot environment 165 can be a persistent boot environment installed by the manufacturer.

The manufacturer boot environment 165 can validate a digital signature of components including binaries, extensible markup language (XML) files, and other files. The manufacturer boot environment 165 can validate components that are signed with a certificate from a manufacturer certificate authority associated with a manufacturer of the client device 109. The manufacturer can partner with the management service 120 in order to allow the manufacturer boot environment 165 to validate and run the management agent 147. The management agent 147 can be signed by a management service certificate of the management service 120, and/or a manufacturer certificate of a manufacturer. The management service 120 can transmit or otherwise provide the management service certificate to the manufacturer certificate authority so that the manufacturer boot environment 165 can validate and run the management agent 147.

The manufacturer boot environment 165 can provide runtime Software Development Kit (SDK) Application Programming Interface (API) functionalities. The runtime SDK API can include functionality that sets boot variables 157, including the provisioning variables, to true or false. For example "SystemManager::SetBooleanM ("bios.provisioning.complete", true/false)," can set a local bios variable that indicates whether provisioning is completed or currently provisioned. Analogous functionality can be used to set network-accessed boot variables 157. The runtime SDK API can also include functionality that returns control back to the manufacturer boot environment 165 or the main operating system 164. For example, "Systemmanager::Restart (target=serviceos/mainos)." The runtime SDK API can also include functionality to download a particular package or binary, such as the current versions of the management components 146. For example, "SystemManager::DownloadPackage( )" The runtime SDK API can also include functionality for the main operating system 164 provisioning, for example, "ConfigManager:: DISM_APIs( )."

The boot manager or process can check a boot configuration of the client device 109, such as a BIOS variable or another boot variable that indicates whether to boot to the main operating system 164 or the manufacturer boot environment 165. In addition, the events can trigger the boot process to boot to the manufacturer boot environment 165. For example, the boot process can identify that a certain event has occurred, such as a threshold number of failures to boot to the main operating system 164, a driver crash, a threshold number of operating system 164 crashes, a failure to replace a driver, or other events. In some cases, another process can change a boot variable 157, such as a boot selection variable. The boot process can identify a state of the boot variable 157 and boot to the manufacturer boot environment 165.

The management components 146 can include local versions of the management agent 147 and the management application 149. The local versions of the management components 146 can be manufacturer-installed on the client device 109. The management agent 147 can be considered a component of the manufacturer boot environment 165, and can be executed by the manufacturer boot environment 165. The management agent 147 can be compatible with a framework supported by the manufacturer boot environment 165. For instance, the manufacturer boot environment 165 can support a particular .NET Framework such as .NET 4.5. In addition, the management agent 147 can operate in the absence of features that are unsupported by the manufacturer boot environment 165, such as a scheduling service. The management agent 147 can be utilized to provision the main operating system 164. For example, the management agent 147 can install the management application 149 and obtain the enrollment data 161 from the management service 120.

The management application 149 can be a management component 146 that can execute from the main operating system 164. The management application 149 can perform actions on the client device 109. For instance, the management application 149 can enroll the client device 109 with the management service 120. The management application 149 can transmit an enrollment request to an enrollment endpoint of the management service 120. The enrollment request can include an enrollment token and a device identifier of the client device 109. The management application 149 can receive and install an enrollment policy 131 to complete enrollment. The enrollment policy 131 can be transmitted from the management service 120 to the client device 109. The management application 149 can perform enrollment during the out of box experience (OOBE) or startup configuration process of the main operating system 164.

The management application 149 can also cause the client device 109 to check-in with the management service 120, identify an action in the command queue and perform the action. An action can include the installation of a profile, or the execution of a command or other actions to install software components or implement additional policies 131. The management application 149 can cause a check-in of the client device 109 periodically, on a schedule or upon an event, such as entering a physical location, changing a state of the client device 109, installing an application or receiving a notification on the client device 109. In one example, the contents of the command queue can include a command that the management application 149 executes on the client device 109. In another example, the contents of the command queue can include a resource that the management application 149 installs on the client device 109.

In some examples, the boot variables 157 can be locally-stored variables such as BIOS variables of the client device 109. The boot variables 157 can include provisioning variables. The provisioning variables can include a provisioning requirement variable that indicates whether a client device 109 requires provisioning. The provisioning variables can also include a provisioning status variable that indicates whether the device is currently provisioned. The boot variables 157 can be stored in the data store 123 and accessed over the network 112 by the management components 146 and the manufacturer boot environment 165. The boot variables 157 can affect the actions performed by the management components 146 and the manufacturer boot environment 165.

Figure 2A:
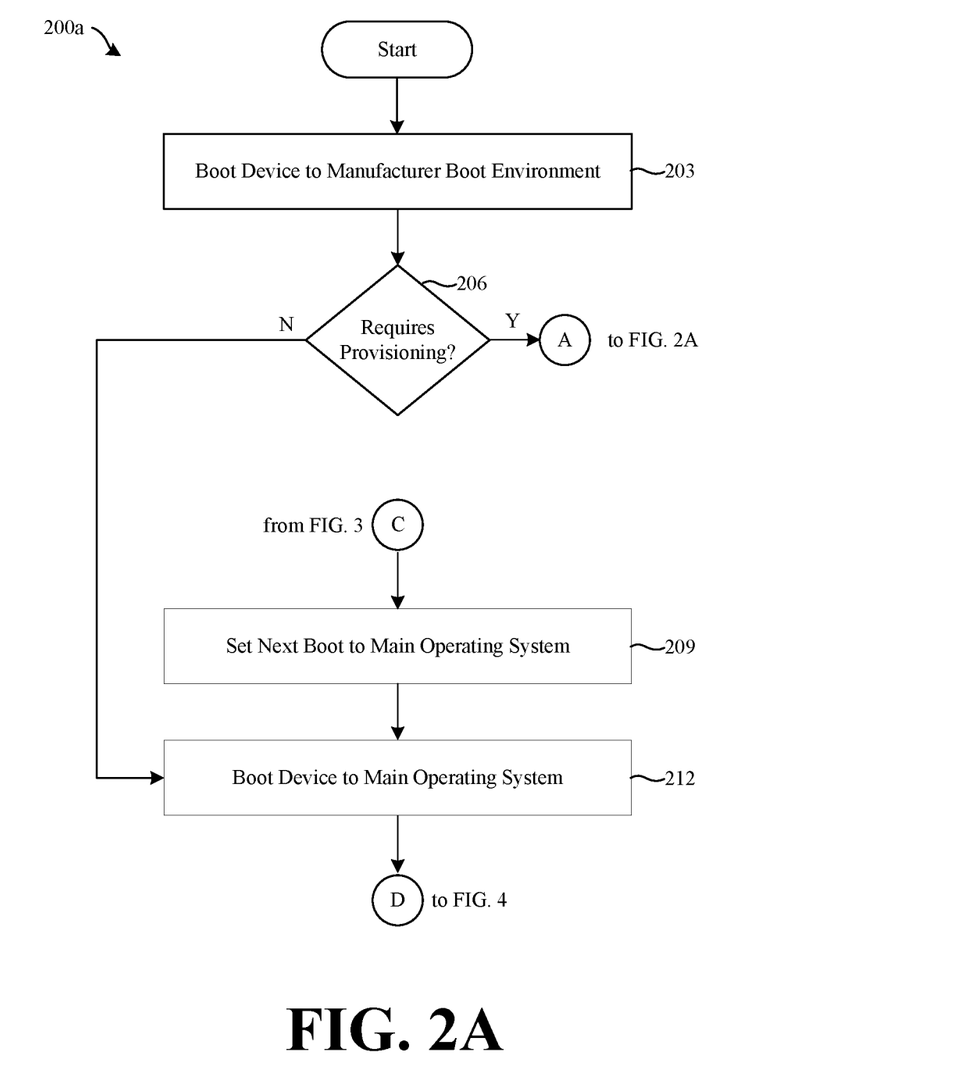
FIG. 2A is an example flowchart illustrating functionality implemented by components of the networked environment.

In FIG. 2A, shown is an example flowchart 200a describing steps performed by the components of the networked environment 100. The flowchart 200a can work in conjunction with the flowchart 200b of FIG. 2B, the flowchart 300 of FIG. 3, and the flowchart 400 of FIG. 4. As a whole, these flowcharts describe how instructions that are executed in the client device 109 work in concert with the management service 120 in order to ensure that the client device 109 remains provisioned for management by the management service 120. The instructions executed in the client device 109 can include instructions comprising the manufacturer boot environment 165, the management agent 147, the main operating system 164, the management application 149, and the boot process of the client device 109. Generally, the flowcharts 200a and 200b describe how instructions comprising a boot process and the manufacturer boot environment 165 can determine whether the client device 109 requires provisioning, and facilitates execution of the management components 146 in the manufacturer boot environment and the main operating system 164.

In step 203, a boot process of the client device 109 can boot to a manufacturer boot environment 165. On an initial boot of the client device 109, the client device 109 can be configured to boot to the manufacturer boot environment 165 rather than the main operating system 164. For example, the boot process can check a boot variable 157 of the client device 109. The boot variable 157 can be a boot selection variable that indicates whether to boot to the manufacturer boot environment 165 or to boot the main operating system 164. While the client device 109 can be configured to boot to the manufacturer boot environment 165 on initial startup, other events can trigger a boot to the to the manufacturer boot environment 165. For example, the boot manager can identify that a certain event has occurred, such as a threshold number of failures to boot to the main operating system 164, a driver crash, a threshold number of main operating system 164 crashes, a failure to replace a driver, or other events.

In step 206, the manufacturer boot environment 165 can determine whether the client device 109 requires provisioning. The manufacturer boot environment 165 can check a provisioning requirement variable that indicates whether the client device 109 requires provisioning. A provisioning requirement variable can be activated for client devices 109 that should remain provisioned for management by the management service 120, such as enterprise-owned devices. Provisioning can indicate that the client device 109 has the management application 149 stored or installed.

If the provisioning requirement variable indicates that the client device 109 requires provisioning, the process can move to connector A. If the provisioning requirement variable indicates that the client device 109 requires provisioning, the process can move to step 212.

Generally, connector A can lead to a process that prepares the management agent 147 to provision the main operating system 164 with the management application 149. The management agent 147 returns control to the manufacturer boot environment 165. The process then moves to connector C.

The process can move to step 209 from connector C. In step 209, the manufacturer boot environment 165 can set a variable that causes the client device 109 to boot to a main operating system 164 on the next boot. For example, the manufacturer boot environment 165 can set the boot selection variable to boot to the main operating system 164.

In step 212, the client device 109 can boot to the main operating system 164. The boot process can check the boot selection variable. A state of the boot selection variable can indicate that the client device 109 should boot to the main operating system 164. The boot process can boot to the main operating system 164. The process can move to connector D.

Generally, connector D can lead to a process that executes the management application 149 within the main operating system 164. The management application 149 can enroll the client device 109 with the management service 120. In some cases, this can be part of an operating system setup process or out-of-box experience of the main operating system 164.

Figure 2B:
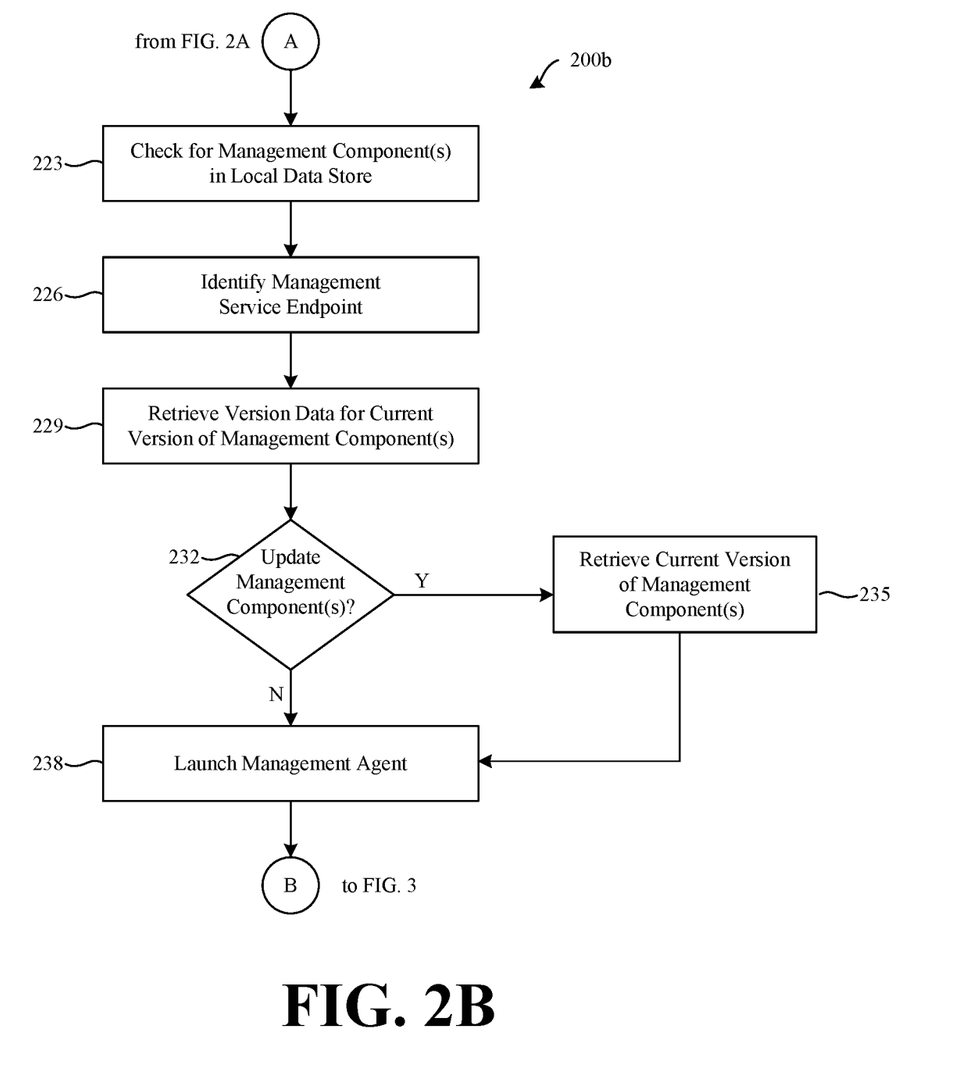
FIG. 2B is an example flowchart illustrating functionality implemented by components of the networked environment.

In FIG. 2B, shown is an example flowchart 200b describing steps performed by the components of the networked environment 100. Generally, the flowchart 200b describes how the manufacturer boot environment 165 prepares the management agent 147 for execution on the client device 109.

The process can move to step 223 from connector A. Connector A connects from FIG. 2A. Generally, connector A can describe a point at which the manufacturer boot environment 165 determines that the client device 109 requires provisioning.

In step 223, the manufacturer boot environment 165 can check for management component(s) 146 in a data store 163 of the client device 109. The management component(s) 146 can include one or more of the management agent 147 and the management application 149. The manufacturer boot environment 165 can be configured with a list, table, or other data structure that indicates a number of software components to maintain on the client device 109. The list of software components can indicate the management components 146, including the management agent 147 and the management application 149. While the discussion refers to the management components 146, this can be representative of the management components 146 collectively or individual ones of the management agent 147 and the management application 149. For instance, both of the management components 146 can be included in an installation file, a compressed file, or another file or data structure. Alternatively, the management agent 147 and the management application 149 can be stored separately. The manufacturer boot environment 165 can check the list for a memory location on the data store 163 of the client device 109 where the management components 146 should be stored. The manufacturer boot environment 165 can unpack the management components 146 from the data store 163. In some cases, one or more of the management components 146 can be absent from the data store 163.

In step 226, the manufacturer boot environment 165 can identify a management service endpoint such as a download endpoint where the management components 146 can be downloaded. The list of software components can include a Uniform Resource Locator (URL), Internet Protocol (IP) address, or other network address of the download endpoint for the management components 146.

In step 229, the manufacturer boot environment 165 can retrieve version data for the current version of the management components 146. The manufacturer boot environment can transmit a request for current version data to the management service 120. In some examples, the manufacturer boot environment 165 can transmit the request for current version data to the download endpoint, a current version data endpoint, or another endpoint of the management service 120. The management service 120 can return the current version data to the client device 109. The current version data can be included in a file, a header, or another data structure. A current version data file can include a markup language file, text information (INFO) file, JavaScript Object Notation (JSON) file or another format. Markup language files can include extensible markup language (XML) files, hypertext markup language (HTM, HTML) files, extensible HTML (XHTML) files, and others.

In step 232, the manufacturer boot environment 165 can determine whether to retrieve management components 146 from the management service 120. For example, the manufacturer boot environment 165 compares the current version of the management components 146 to a local version of the management components 146. The manufacturer boot environment 165 can identify the current version of the management components 146 using the current version data retrieved from the management service 120.

The manufacturer boot environment 165 can identify the local version of the management components 146 using local version data stored on the data store 163. The local version data can be stored as a file, a header, or another data structure in the data store 163. A local version data file can include a markup language file, text information (INFO) file, JavaScript Object Notation (JSON) file or another format. When the current version of the management components 146 is different from or newer than the local version, the manufacturer boot environment 165 can determine that the management components 146 are to be updated, and retrieve them from the management service 120. Likewise, when a local version of the management components 146 is unidentified, or local version data is unidentified, the manufacturer boot environment 165 can retrieve the management components 146 from the management service 120. If the manufacturer boot environment 165 determines to retrieve the management components 146 from the management service 120, the process can move to step 235. If the current version of the management components 146 matches the local version, the manufacturer boot environment 165 can move to step 238 without retrieving the management components 146 from the management service 120.

In step 235, the manufacturer boot environment 165 can retrieve the current version of the management components 146 from the management service 120. For example, the manufacturer boot environment 165 can transmit a download request for the management components 146. The manufacturer boot environment 165 can receive the current version of the management components 146 from the management service 120 or download endpoint.

In step 238, the manufacturer boot environment 165 can launch or execute the management agent 147. The management agent 147 can be compatible with a framework supported by the manufacturer boot environment 165, and can be signed with a manufacturer certificate and/or a management certificate that is promulgated by a certificate authority associated with a manufacturer of the client device 109. The manufacturer boot environment 165 can validate a digital signature of the management agent 147 and proceed to execute the management agent 147. The process can move to connector B, which connects to FIG. 3

Figure 3:
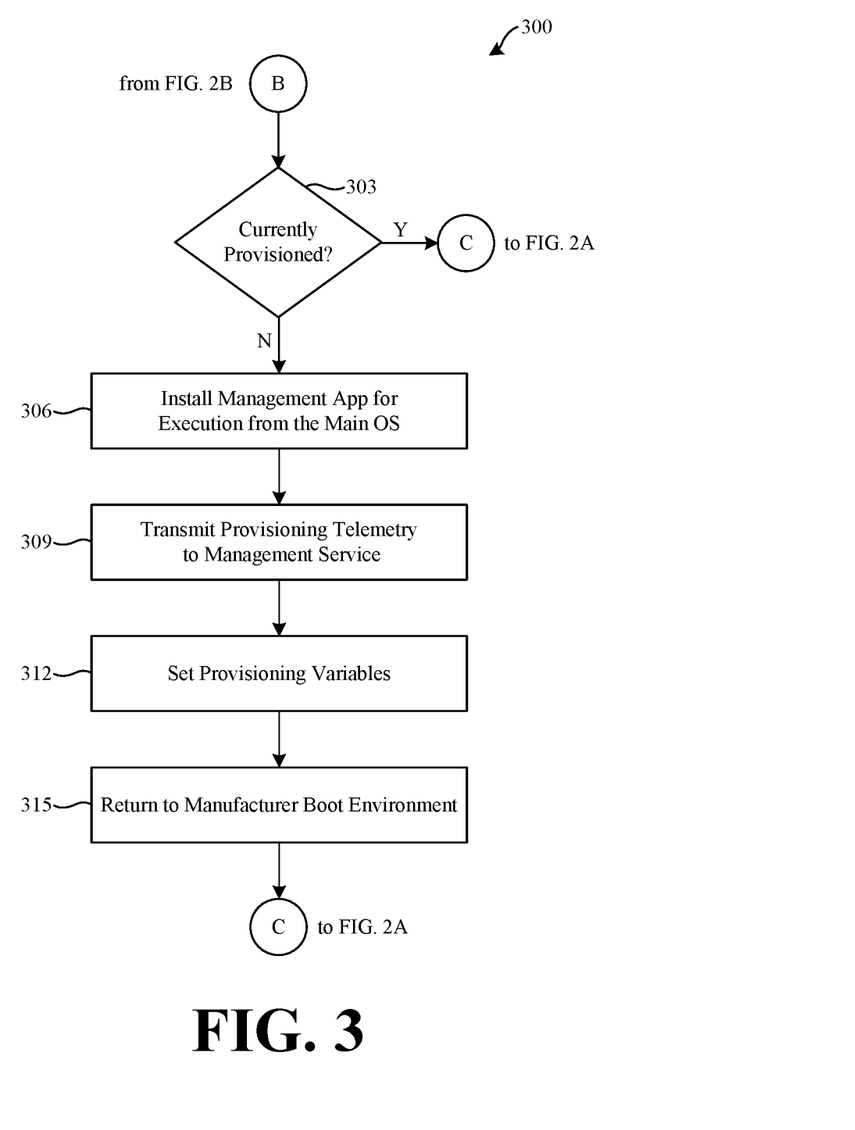
FIG. 3 is an example flowchart illustrating functionality implemented by components of the networked environment.

In FIG. 3, shown is an example flowchart 300 describing steps performed by the components of the networked environment 100. Generally, the flowchart 300 describes how the management agent 147 can prepare the management application 149 for execution from the main operating system 164 of the client device 109.

In step 303, the management agent 147 can determine whether the main operating system 164 of the client device 109 is currently provisioned for management by the management service 120. The management application 149 can be a management component 146 executable from the main operating system 164. The management agent 147 can determine whether the management application 149 is installed or otherwise prepared for execution. The management agent 147 can check a provisioning status variable that can indicate whether the main operating system 164 of the client device 109 is currently provisioned or unprovisioned. In other examples, the management agent 147 can determine whether the management application 149 or a particular file associated with the management application 149 is located in an expected installation directory for the management application 149. If the main operating system 164 of the client device 109 is currently provisioned, the process can move to connector C, which connects to FIG. 2A. If the main operating system 164 of the client device 109 is currently unprovisioned, the process can move to step 306.

In step 306, the management agent 147 can install the management application 149 for execution from the main operating system 164. For example, the management agent 147 can unpack an installation file or compressed file of the management application 149 to a particular folder or memory location on the data store 163.

In step 309, the management agent 147 can transmit provisioning telemetry data to the management service 120. The provisioning telemetry data can include information relevant to the provisioning of the client device 109. For example, the provisioning telemetry data can include a client device model identification, a manufacturer boot environment identification, a main operating system identification, a management application identification, a total provisioning time, and a provisioning result identification. The model identification of the client device 109 can include a model number assigned by the manufacturer, a unique device identifier of the client device 109 assigned by the management service 120, and other identifications. The manufacturer boot environment identification can include a product name and a version of the manufacturer boot environment 165. The main operating system identification can include a product name and a version of the main operating system 164. The total provisioning time can include a duration from a last boot time to the completion of the installation of the management application 149. Alternatively, the total provisioning time can refer to a duration from execution of the management agent 147 to the completion of the installation of the management application 149. The provisioning result identification can identify whether provisioning was successful or unsuccessful, for example, whether the management application 149 was successfully installed, or if the installation failed.

In step 312, the management agent 147 can set provisioning variables. If the management application 149 was successfully installed, the management agent 147 can set the provisioning status variable to indicate that the client device 109 is provisioned for management by the management service 120. Otherwise, the management agent can set the provisioning status variable to indicate that the client device 109 is unprovisioned.

In step 315, the management agent 147 can return to the manufacturer boot environment 165. The management agent 147 can invoke a runtime SDK API provided by the manufacturer boot environment 165. The runtime SDK API can return control back to the manufacturer boot environment 165. The process can move to connector C, which connects to FIG. 2A.

Figure 4:
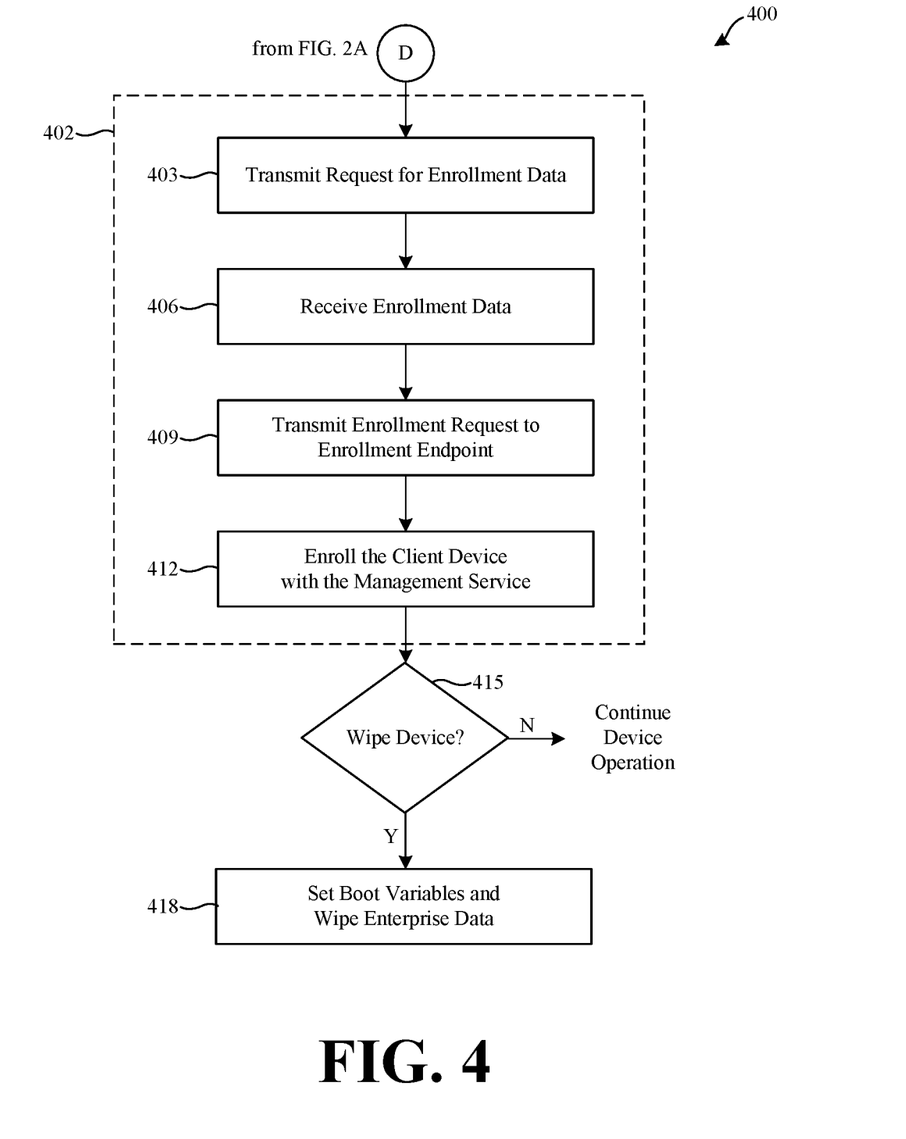
FIG. 4 is an example flowchart illustrating functionality implemented by components of the networked environment.

In FIG. 4, shown is an example flowchart 400 describing steps performed by the components of the networked environment 100. Generally, the flowchart 400 describes how the management application 149 can enroll the client device 109 with the management service 120. The flowchart 400 further describes how management application 149 can wipe enterprise data from the client device 109 while maintaining ability to re-provision the wiped device.

The enrollment process 402 describes how the management application 149 can enroll the client device 109 with the management service 120. An out-of-box-experience of the main operating system 164 can include a simple guided user interface to setup the main operating system 164. The enrollment process 402 can be performed during an out-of-box experience of the client device 109, or immediately thereafter. For example, the out-of-box experience can be modified to include the enrollment process 402, or the enrollment process 409 can begin thereafter. In some examples, a user interface can be displayed during the enrollment process 409, which can notify a user of a status of the enrollment process. User inputs including a personal identification number (PIN), a username and password, or other credentials can be obtained. In other examples, the enrollment process 402 can be completed automatically, without user input.

In step 403, the management application 149 can transmit a request for enrollment data to the management service 120. Such an enrollment data request can include a client device identifier that uniquely identifies the client device 109. The client device identifier can be a unique device identifier generated by the management service 120 or the manufacturer, and assigned to the client device 109. The management service 120 can check the device data 125 to identify whether the client device identifier is registered with the management service 120 as an enterprise device. If the client device identifier is registered with the management service 120, the management service 120 can return enrollment data 161. In some cases, the management application 149 can generate a user interface that includes a user interface element through which credentials can be entered by a user. The management application 149 can obtain user-entered credentials. The user-entered credentials can be included in a request for enrollment data 161 along with, or instead of, the client device identifier.

In step 406, the management application 149 can receive enrollment data 161. The enrollment data 161 can include an enrollment token. In some examples, the enrollment data 161 identifies an enrollment endpoint of the management service 120. The enrollment endpoint can include a URL, IP address, or another network address. The enrollment token can be a character string, parameter, or file that authenticates the client device 109 for enrollment with the management service 120.

In step 409, the management application 149 can transmit an enrollment request to an enrollment endpoint of the management service 120. The enrollment request can include the enrollment token. The enrollment request can also include the client device identifier. The management application 149 can receive an enrollment policy from the management service 120 in response to the enrollment request.

In step 412, the management application 149 can enroll the client device with the management service. The management application 149 can install the enrollment policy to complete the enrollment of the client device 109 with the management service 120.

In step 415, the management application 149 can determine whether to wipe the client device 109. For example, the wipe can include an enterprise wipe, an operating system wipe, a hard drive wipe, or another wipe of the client device 109. The enterprise wipe can refer to removal of enterprise data from the client device 109. An operating system wipe can refer to reinstallation or repair of the main operating system 164. A hard drive wipe can include formatting or deletion of all data on a hard drive of the client device 109. These operations can result in a loss of enrollment and/or provisioning of the client device 109.

The management service 120 can place a wipe command into a command queue of the client device 109. The wipe command can include an enterprise wipe command, a hard drive wipe command, or an operating system wipe command. In some cases, a client device 109 can be operating poorly, and the wipe can be used in order to return the device to proper operation. In other cases, a client device 109 can be transferred to another enterprise, or another division of a current enterprise utilizing the management service 120. The management application 149 can retrieve the wipe command from the command queue. The user of the client device 109 can also select a user interface element of the management application 149 that issues a wipe command. If a wipe command is received, the process can move to step 418. Otherwise, the device can continue normal operation.

In step 418, the management application 149 can set boot variables and perform the wipe command on the client device 109. The management application 149 can set boot variables that include the provisioning variables. When the wipe command is an enterprise wipe command, the management application 149 can remove enterprise data 126 from the client device 109. The enterprise data 126 can include the management application 149 the enrollment policy, and other policies 131, as well as other enterprise data 126.

The boot variables 157 can be set according to instructions included along with the wipe command. When provisioning or enrollment will be lost as a result of the wipe command, the provisioning status variable can be changed to indicate that the device 109 is currently unprovisioned. Generally, the provisioning requirement variable can be set or remain to indicate that provisioning is still required. However, if the client device 109 is being sold or transferred to a person that does not utilize the management service 120, the provisioning requirement variable can be set to indicate that provisioning is unrequired.

The client devices 109 and devices of the management system 103 can include at least one processor circuit, for example, having a processor and at least one memory device, both of which couple to a local interface, respectively. The device can include, for example, at least one computer, mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor. This code can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a management application 149, or another application can be rendered. The user interface can be generated with user interface data provided by the management system 103. The client devices 109 can also include one or more input/output devices that can include, for example, a capacitive touchscreen or other type of touch input device, fingerprint reader, or keyboard.

Although the management service 120, management agent 147, management application 149, manufacturer boot environment 165, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
a client device; and
a memory comprising executable instructions, wherein the instructions, when executed by a processor, cause the client device to at least:
execute a management agent from a manufacturer boot environment;
install, by the management agent, a management application that is executable in the main operating system to provision the client device for management by a management service;
set, by the management agent, a provisioning status BIOS variable to indicate that the client device is provisioned for management by a management service; and
boot the client device to the main operating system, wherein the management application is executed from the main operating system.

2. The system of claim 1, wherein the instructions, when executed by a processor, cause the client device to at least:
transmit, by the management agent, provisioning telemetry data to the management service.

3. The system of claim 2, wherein the provisioning telemetry data comprises at least one of: a client device model identification, a manufacturer boot environment identification, a main operating system identification, a management application identification, a total provisioning time, and a provisioning result identification.

4. The system of claim 1, wherein the instructions, when executed by a processor, cause the client device to at least:
enroll, by the management application, the client device with the management service.

5. The system of claim 1, wherein the instructions, when executed by a processor, cause the client device to at least:
read, by the management agent, the provisioning status BIOS variable of the client device to identify that the client device is unprovisioned, wherein the management agent installs the management application based on the client device being identified as unprovisioned.

6. The system of claim 1, wherein the manufacturer boot environment downloads at least one of the management agent and the management application.

7. The system of claim 1, wherein the management application enrolls the client device with the management service during an out-of-box experience of the client device.

8. A method comprising:
executing a management agent from a manufacturer boot environment of a client device;
installing, by the management agent, a management application that is executable in the main operating system to provision the client device for management by a management service;
setting, by the management agent, a provisioning status BIOS variable to indicate that the client device is provisioned for management by a management service; and
booting the client device to the main operating system, wherein the management application is executed from the main operating system.

9. The method of claim 8, further comprising:
transmitting, by the management agent, provisioning telemetry data to the management service.

10. The method of claim 9, wherein the provisioning telemetry data comprises at least one of: a client device model identification, a manufacturer boot environment identification, a main operating system identification, a management application identification, a total provisioning time, and a provisioning result identification.

11. The method of claim 8, further comprising:
enrolling, by the management application, the client device with the management service.

12. The method of claim 8, further comprising:
reading, by the management agent, the provisioning status BIOS variable of the client device to identify that the client device is unprovisioned, wherein the management agent installs the management application based on the client device being identified as unprovisioned.

13. The method of claim 8, wherein the manufacturer boot environment downloads at least one of the management agent and the management application.

14. The method of claim 8, wherein the management application enrolls the client device with the management service during an out-of-box experience of the client device.

15. A non-transitory computer-readable medium embodying executable instructions, wherein the instructions, when executed by a processor, cause a client device to at least:
execute a management agent from a manufacturer boot environment;
install, by the management agent, a management application that is executable in the main operating system to provision the client device for management by a management service;
set, by the management agent, a provisioning status BIOS variable to indicate that the client device is provisioned for management by a management service; and
boot the client device to the main operating system, wherein the management application is executed from the main operating system.

16. The non-transitory computer-readable medium of claim 15, wherein the instructions, when executed by a processor, cause the client device to at least:
transmit, by the management agent, provisioning telemetry data to the management service.

17. The non-transitory computer-readable medium of claim 16, wherein the provisioning telemetry data comprises at least one of: a client device model identification, a manufacturer boot environment identification, a main operating system identification, a management application identification, a total provisioning time, and a provisioning result identification.

18. The non-transitory computer-readable medium of claim 15, wherein the instructions, when executed by a processor, cause the client device to at least:
enroll, by the management application, the client device with the management service.

19. The non-transitory computer-readable medium of claim 15, wherein the instructions, when executed by a processor, cause the client device to at least:
read, by the management agent, the provisioning status BIOS variable of the client device to identify that the client device is unprovisioned, wherein the management agent installs the management application based on the client device being identified as unprovisioned.

20. The non-transitory computer-readable medium of claim 15, wherein the manufacturer boot environment downloads at least one of the management agent and the management application.

\* \* \* \* \*